3,520,827
PROCESS FOR MANUFACTURING NEW POLYMERIZATION CATALYSTS, THE RESULTING NEW CATALYSTS AND THEIR USES
Jean Lepage, Saint-Germain-en-Laye, and Maseh Osgan, Paris, France, assignors to Institut Francais du Petrole des Carburants et Lubrifiants, Rueil-Malmaison, France
No Drawing. Filed Nov. 24, 1967, Ser. No. 685,289
Claims priority, application France, Dec. 2, 1966, 86,080
Int. Cl. B01j *11/84*
U.S. Cl. 252—431                                    7 Claims

ABSTRACT OF THE DISCLOSURE

A polymerization catalyst consists of partially hydrolyzing a double alcoholate of the Formula I $M^1[M(OR)_4]_2$ by means of water. Instead of the complex of Formula I a mixture of alcoholates of the Formula II $M(OR)_3$ and III $M^1(OR)_2$ may be subjected to the hydrolysis step. In Formulas I to III, M is a trivalent metal selected from Groups III to VIII as well as arsenic, antimony or bismuth, $M^1$ is a bivalent metal selected from Groups IIa and IIb as well as amongst metals of atomic Nos. 22 to 29 and R is a monovalent hydrocarbon radical.

---

This invention relates to new catalysts for the polymerization of alkylene oxides as well as their processes of manufacture.

It is known to use for this type of polymerization numerous catalysts amongst which compounds of the formula:

$$M'[M(OR)_4]_2$$

are to be mentioned more particularly, these compounds being better known as Meerwein complexes. In this formula, M and M' are respectively trivalent and bivalent metals, R being a monovalent hydrocarbon radical.

The hydrolysis products of $Al(OR)_3$ or $Fe(OR)_3$ are also known as polymerization catalysts.

These varied catalysts have not given satisfactory results. As a matter of fact, the rates of conversion of monomers to polymers with these catalysts were not high; moreover it was necessary to work at temperatures higher than 70° C.; finally the molecular weights of the obtained polymers were not satisfactory.

It has now been discovered that it was possible, by means of the catalysts of this invention, to obtain conversion rates higher than 75%, although operating at temperatures of 50° C. or lower and for polymerization times lower than those necessary up to now with conventional catalysts.

It has also been observed that its was possible to use these catalysts for curing epoxy resins, and also as polytransesterification catalysts, for example in the synthesis of ethyleneglycol polyterephthalate starting from methyl terephthalate and ethylene glycol.

The process for manufacturing catalysts according to this invention consists of partially hydrolysing a double alcoholate of the formula $M'[M(OR)_4]_2$ (I) by means of water in a molar amount of 10% to 400% with respect to the amount of complex which is submitted to hydrolysis.

Instead of the complex of Formula I a mixture of alcoholates of the two metals, i.e.

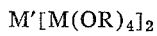 $M(OR)_3$ (II) and $M'(OR)_2$ (III) may be subjected in the same manner to the hydrolysis step.

In Formulae I to III, M is a trivalent metal selected from Groups III to VIII as well as arsenic, antimony or bismuth.

With alcoholates of Formulae II and III the preferred ratio M/M' will be from 0.5:1 to 3:1, preferably 2:1.

However satisfactory results are obtained for ratios as low as 1:100 and as high as 100:1.

As examples of trivalent metals M, the following will be preferably named: aluminum, gallium, indium and thallium.

Other useful metals are those of atomic Nos. 21 to 27, 40 to 45 and 72 to 77 of the same periodic chart of the elements.

Of course when a metal belonging to the above groups is able to have several valence states, only the compound of metal in the trivalent state will be used.

M' is a bivalent metal selected from Groups IIa and IIb as well as amongst metals of atomic Nos. 22 to 29. Here also only the compound of M' in the bivalent state will be used for the manufacture of the catalytic system of this invention.

As preferred bivalent metals, cobalt and zinc will be named.

The monovalent radical R in Formulae I to III which preferably contains 1 to 30 carbon atoms may be chosen amongst alkyl, cycloalkyl, alkenyl, cycloalkenyl, aryl, aralkyl, alkylaryl radicals as well as amongst the above-referred radicals, in which a halogen atom or a —OR' group has been substituted for a hydrogen atom, R' being a monovalent hydrocarbon radical containing 1–4 carbon atoms.

It is understood that in Formulae I to III, the R radicals may be same or different.

The manufacture of the Meerwein complexes has been broadly described in the literature, for example in "Methoden der organischen Chemie" by Houben-Wayl, 4th edition, vol. VI/2, pages 30–32.

The partial hydrolysis of the Meerwein complex or of the mixture of alcoholates of the two metals leads to compounds which in the present state of knowledge, have the formula:

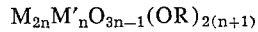 $M_{2n}M'_nO_{3n-1}(OR)_{2(n+1)}$ (IV) where $n$ is an integer from 1 to 32 and preferably from 1 to 4.

The hydrolysis may be carried out on compounds of Formula I or mixture (II+III) in the solid state or as solution in a solvent, for example a hydrocarbon or a halohydrocarbon.

In the first case, there will be passed for example, steam, diluted or not by an inert gas, on the compound in the solid state.

In the second case, although pure water may be used, it is preferred previously to dilute the latter in a hydrophilic solvent, for example an alcohol of low molecular weight (containing for example from 1 to 5 carbon atoms) such as ethanol, propanol, isopropanol, butanol, pentanol, or in solvents such as ethyl ether, dioxane, tetrahydrofuran, acetone or others; a more active catalyst is thus obtained.

It is also possible to use a mixture of the above solvents, or, together with the hydrophilic solvent, a co-solvent such as benzene, toluene, xylenes, chlorobenzene, orthodichlorobenzene, heptane, octane.

However it is preferred to work in an alcoholic environment.

The hydrolysis may be carried out at temperatures between —10 and +230° C. and preferably between +20 and +180° C.

The hydrolysed complex or double alcoholate is recovered by any convenient means, for example by distillation, usually under reduced pressure, or by filtration if the catalyst is not very soluble in the hydrolysis solvent.

It is optionally possible to carry out a final drying of the catalyst, for example by lyophilisation.

It must be understood that a mixture of several hydrolysed complexes of Formula IV may also be used as polymerization catalyst, each of them exhibiting a distinct $n$ figure.

The catalytic system of this invention will be advantageously used for polymerizing alkylene oxides and more particularly cyclic ethers, the cycle of which contains 3 or 4 carbon atoms, i.e. essentially 1,2-epoxides or 1,3-epoxides (oxetanes or oxacyclobutanes). These compounds usually contain 2 to 20, preferably 3 to 12 carbon atoms per molecule.

Amongst epoxides, those which answer the general formula:

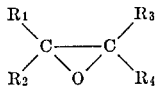

are to be specially mentioned.

In this formula, $R_1$ to $R_4$ are hydrogen atoms and/or hydrocarbon radicals optionally substituted by atoms or radicals which have no detrimental effect on the polymerization. The alkyl, cycloalkyl, aryl, alkenyl, cycloalkenyl and haloalkenyl radicals are preferred.

Amongst 1,2-epoxides, the following compounds will be named by way of examples: epoxyethane, 1,2-epoxypropane, 1,2-epoxybutane, epoxyisobutane, epichlorohydrin, styrene oxide, m.chlorostyrene oxide, α-methylstyrene oxide, cyclohexene oxide, phenylglycidylether, chlorophenylglycidylether, methoxyphenylglycidyl ether, methylglycidylether, isopropylglycidylether, allylglycidylether, butadiene monoxide, cyclooctadiene monoxide, isooctene oxide.

Amonst oxetanes, the following will be named by way of examples: 3,3-bis(chloromethyl)-oxacyclobutane, 1,3-epoxypropane, 2,4-epoxybutane, 2-methyloxetane, 3,3-bis(cyanomethyl) oxetane, 3,3-diethyloxetane, 3-methyl-3-propyloxetane, 3-ethyl-3-butyloxetane.

These various monomers may be used alone or as mixtures. For example it will be possible to copolymerize two, three, four, or more monomers to obtain copolymers with special properties.

The polymerizations may be carried out in a broad range of temperatures, for example between —80 and +200° C., preferably between 20 and 120° C.

The operation is preferably carried out in the substantial absence of oxygen or water, according to well-known techniques.

The proportion of catalyst may be comprised for example between 0.001 and 30 gram-atoms (total amount of M+M') per 100 moles of monomers. It depends on the desired polymerization rate, as well as the purity of the monomers. The catalyst may be added either before or after the monomer.

Either the catalyst or the monomer may be added in one time or by fractions or continuously. According to a preferred embodiment, 2 to 15% by weight of the total amount of monomer (or mixture of monomers) may be added to a diluted solution of the catalyst, and, after 10 to 30% conversion to polymer, the remaining part of the monomer or monomers is added.

The polymerization may be carried out either in bulk or in solution. All diluents may be used which are free of water or free of alcoholic, aldehydic, acidic or ketonic groups. Among preferred diluents, the following may be named by way of examples: heptane, hexane, pentane, butane, petrol ether, cyclohexane, benzene, toluene, dioxane, ethyl ether, isopropyl ether, methylene dichloride, ethylene dichloride and the like.

The following non-limitative examples are given to illustrate the invention (the temperatures are in Celsius degrees).

EXAMPLE 1

21.1 g. of zinc di-n-butoxide $(BuO)_2 Zn$ and 49.2 g. of aluminium tri-n-butoxide $(BuO)_3Al$, i.e. 0.1 and 0.2 moles of these organometallic compounds respectively, are introduced into a reaction flask under argon atmosphere. 60 ccm. of xylene are also added and the resulting solution is boiled while stirred.

200 ccm. of n-butanol containing 3.6 g. water are then added at a rate of 0.5 ccm. per minute.

The molar ratio $H_2O/Zn[Al(BuO)_4]_2$ is 2 since the mixture of the alcoholates behaves just as the previously formed Meerwein complex towards hydrolysis.

The vapors escaping from the vessel are condensed.

The heating at reflux is continued for one hour after the end of the addition of the alcohol.

The n-butanol is thereafter distilled under reduced pressure, followed by the xylene. The residue is taken up in 200 ccm. of benzene, and dried by lyophilisation. There is thus recovered a hydrolysed organometallic compound which is very active as polymerization catalyst.

The analysis of the OR groups of catalyst A by vapor phase chromatography after hydrolysis of the same with sulfuric acid and drying on sodium sulfate, gives a ratio n-butanol/aluminum of 1.98 for an atomic ratio Al/Zn of 2.

This analysis is in agreement with the expected formula of the hydrolysed product A:

$Al_2ZnO_2(BuO)_4$ (Formula IV where $n=1$)

One third millimole of this hydrolysed product A (i.e. 1 milli-g. atom of Al+Zn) is used to polymerize 1.4 ccm. of 1.2-epoxypropane in 18 ccm. of heptane at the temperature of 50° C.

After 90 minutes of polymerization, the reaction is stopped by addition of 1 ccm. of isopropylamine.

The raw polymer is dissolved in toluene used in a sufficient amount to obtain a diluted solution. To this solution, 10 mg. of antioxidant are added.

This solution of the polymer is washed with an aqueous solution of hydrochloric acid and then with an aqueous solution of sodium bicarbonate and finally with water, in order to remove the catalyst residues.

After evaporation of toluene in an air current, 0.87 g. of polyepoxypropane is recovered, corresponding to a conversion of 75% with respect to the monomer.

The intrinsic viscosity of the polymer is 6.7 dl./g., as determined according to the method of P. J. Flory, in "Principles of Polymer Chemistry," Cornell University Press, 1953, pages 309–310.

By way of comparison, the same amount of epoxypropane has been polymerized using as catalyst the same, however not hydrolysed, mixture of $(BuO)_2Zn$ and $2(BuO)_3Al$, in the same amount, i.e. one milliatom of the two metals Al+Zn.

All other conditions remaining unchanged, the conversion was only 15% after 5 days.

EXAMPLE 2

Example 1 is repeated, except that the amount of water introduced during hydrolysis is varied. The way to carry out the hydrolysis is the same as in Example 1 (same rate of introduction of n-butanol into the reaction mixture, same hydrolysis temperature and the like).

The results are given in Table 1:

| No. of experiment | Molar ratio $H_2O/Zn[Al(BuO)_4]_2$ | BuOH/Al [1] | Composition of the hydrolysis product |
|---|---|---|---|
| 2A | 3.0 | 1.5 | $Al_4Zn_2O_5(BuO)_8$ |
| 2B | 4.0 | 1.35 | $Al_6Zn_3O_8(BuO)_8$ |
| 2C | 6.7 | 1.22 | $Al_{10}Zn_5O_{14}(BuO)_{12}$ |

[1] The ratio between n-butanol and aluminum has been determined by vapor phase chromatography after decomposition of the catalytic system as described in Example I.

1 milli-g. atom (Al+Zn) of each of the thus obtained catalysts has been used to polymerize 1.4 ccm. of 1,2-epoxypropane in 18 ccm. of n-heptane at 50° C. for 90 minutes.

The results have been reported in Table II below:

| Catalyst: | percent conversion |
|---|---|
| 2A | 80 |
| 2B | 63.5 |
| 2C | 38 |

Better yields would have been obtained in experiments 2B and 2C if, for example, the polymerization times had been increased up to values which, however, would have remained lower than in conventional processes (see Example 1, comparative part).

EXAMPLE 3

Example 1 is repeated, except that 20 g. of cobalt di-n-butoxide $(BuO)_2Co$ and 49.2 g. of aluminum tri-n-butoxide are hydrolyzed.

The hydrolyzed product has been analysed by complexometry and vapor phase chromatography and has been found to have the formula:

$$Al_2CoO_2(BuO)_4 \quad (n=1)$$

The catalyst is used to polymerize 1,2-epoxypropane as in Example 1. After 90 minutes of polymerization at 50° C., the conversion to polymer attains 80%. The latter exhibits an intrinsic viscosity of 5.4 dl./g.

EXAMPLE 4

There is prepared a catalyst according to the method of Example 1, starting from calcium and aluminum isopropoxides.

According to the analysis, the resulting is of the formula $Al_2CaO_2(iPrO)_4$ where iPr is the isopropyl radical.

This catalyst is used as in Example 1.

After 20 hours of polymerization at 50° C., the conversion to polyepoxypropane is 20%.

EXAMPLE 5

16 ccm. of 1,2-epoxypropane are copolymerized with 2.3 ccm. of allylglycidylether in 230 ccm. of heptane by means of 2 millimoles (i.e. 6 milli-g. atoms of Al+Zn) of the catalytic system obtained in Example 1. All other conditions being the same as in Example 1, there is obtained after 5 hours of reaction 10 g. of copolymer exhibiting an intrinsic viscosity of 6.7 dl./g.

The unsaturation degree has been determined by the Kempf method (Kempf and Peters, Ind. Eng. Chem. anal. ed., 15, 453, 1943) and found to correspond to a molar amount of 6.7% of allylglycidylether with respect to the copolymer.

Example 1 may be successfully repeated subjecting to hydrolysis the folowing catalysts used in the same molar proportions:

aluminum triisopropoxide and titanium diethoxide
gallium triethoxide and vanadium diethoxide
titanium tributoxide and manganese diethoxide
zirconium tri-isopropoxide and iron diethoxide
vanadium triethoxide and nickel dibutoxide
arsenic trimethoxide and magnesium diethoxide
antimony tributoxide and barium dibutoxide
bismuth tributoxide and zinc diisopropoxide
molybdenum triethoxide and cadmium diphenoxide
chromium tributoxide and zinc di-n-decanoxide
iron triethoxide and calcium dibutoxide
rhodium tributoxide and zinc diethoxide
iridium triethoxide and zinc diisopropoxide The hydrolysed catalysts are able to polymerize epoxypropane.

The alcoholates used as starting materials may be manufactured by any method. By way of example, an anhydrous halogenide of the metal is reacted with a sodium or potassium alcoholate. The alcoholate of the other metal of the catalyst is added thereafter. In some cases said alcoholate of alkaline metal is reacted with a mixture of halogenides of trivalent and bivalent metals.

What is claimed is:

1. Process for manufacturing a polymerization catalyst, comprising partially hydrolizing a mixture of 2 organometalic compounds of formulae $M(OR)_3$ and $M'(OR)_2$ respectively where M is a metal in the trivalent state selected from Groups III to VIII of the periodic chart or from the group consisting of arsenic, antimony and bismuth, M' is a metal in the bivalent state selected from the group consisting of metals of the Group II of the Periodic Chart and metals of atomic Nos. 22 to 29, the R radicals are monovalent hydrocarbon radicals or same radicals substituted by halogen atoms or OR' groups, R containing 1–30 carbon atoms, R' being a monovalent hydrocarbon radical containing 1–4 carbon atoms.

2. Process according to claim 1, wherein the organometallic compounds are used as complexes of formula $$M'[M(OR)_4]_2$$

3. Process according to claim 1 wherein the molar amount of water used for the partial hydrolysis is from 10% to 400% of the molar amount of the mixture of organometallic compounds subjected to hydrolysis.

4. Process according to claim 3, wherein the hydrolysis agent is water admixed with a low molecular weight alcohol containing 1–5 carbon atoms.

5. Process according to claim 3, wherein the hydrolysis is carried out at a temperature between $-10°$ and $+230°$ C.

6. Process according to claim 3, wherein the hydrolysis is carried out at 20–180° C.

7. A new catalyst of the formula:

$$M_{2n}M'_nO_{3n-1}(OR)_{2(n+1)}$$

wherein:

M is a metal in the trivalent state selected from the Groups III to VIII of the periodic chart or from the group consisting or arsenic, antimony and bismuth;
M' is a metal in the bivalent state selected from the group consisting of metals of the Group II of the periodic chart and metals of atomic Nos. 22 to 29, the R radicals are monovalent hydrocarbon radicals or same radicals substituted by halogen atoms or OR' groups, R containing 1–30 carbon atoms, R' being a monovalent hydrocarbon radical containing 1–4 carbons atoms, and
n is an integer from 1 to 32.

References Cited

UNITED STATES PATENTS

| 3,313,740 | 4/1967 | Durst et al. | 252—431 X |
| 3,379,660 | 4/1968 | Hsieh et al. | 252—431 X |
| 3,384,603 | 5/1968 | Elfers | 252—431 X |
| 3,432,445 | 3/1969 | Osgan et al. | 252—431 X |

DANIEL E. WYMAN, Primary Examiner

C. F. DEES, Assistant Examiner

U.S. Cl. X.R.

260—2